United States Patent [19]
Matte

[11] 3,909,201
[45] Sept. 30, 1975

[54] ANALYSIS APPARATUS

[75] Inventor: Claude Matte, Paris, France

[73] Assignee: Centre National de Transfusion Sanguine, Paris, France

[22] Filed: July 9, 1973

[21] Appl. No.: 377,297

[30] Foreign Application Priority Data
Mar. 22, 1973 France .............................. 73.10393
July 13, 1972 France .............................. 72.25541

[52] U.S. Cl. ................................ 23/253 R; 23/259
[51] Int. Cl.² ......................................... G01N 31/00
[58] Field of Search ............. 23/253 R, 259, 253 TP; 195/127, 103.5 R, 103.5 C; 222/420; 356/201, 180

[56] References Cited
UNITED STATES PATENTS

| | | | |
|---|---|---|---|
| 3,526,480 | 9/1970 | Findl et al. .......................... | 23/253 R |
| 3,617,222 | 11/1971 | Matte .............................. | 23/253 R X |
| 3,695,842 | 10/1972 | Mintz ............................. | 23/253 R X |
| 3,722,790 | 3/1973 | Natelson .......................... | 23/259 X |
| 3,728,081 | 4/1973 | Bidanset ......................... | 23/253 R X |
| 3,775,058 | 11/1973 | Bush ............................. | 23/253 R X |
| 3,796,544 | 3/1974 | Zauft et al. ..................... | 23/253 R X |

*Primary Examiner*—Joseph Scovronek
*Attorney, Agent, or Firm*—Larson, Taylor and Hinds

[57] ABSTRACT

Analysis apparatus for carrying out particle agglutination, flocculation or precipitation for liquid samples, in particular blood samples. Supports provided with a plurality of microcontainers, in which reactions between samples and analysis reagents are carried out, are transferred from a sample and reagent dispensing station to a reaction observation station. Each support, having received a predetermined quantity of sample for analysis and of analysis reagents, is rotated about its axis in a plane at an angle comprised between 75° and 85° in relation to the horizontal, the rotation speed being about from 0.5 to 10 rpm.

21 Claims, 18 Drawing Figures

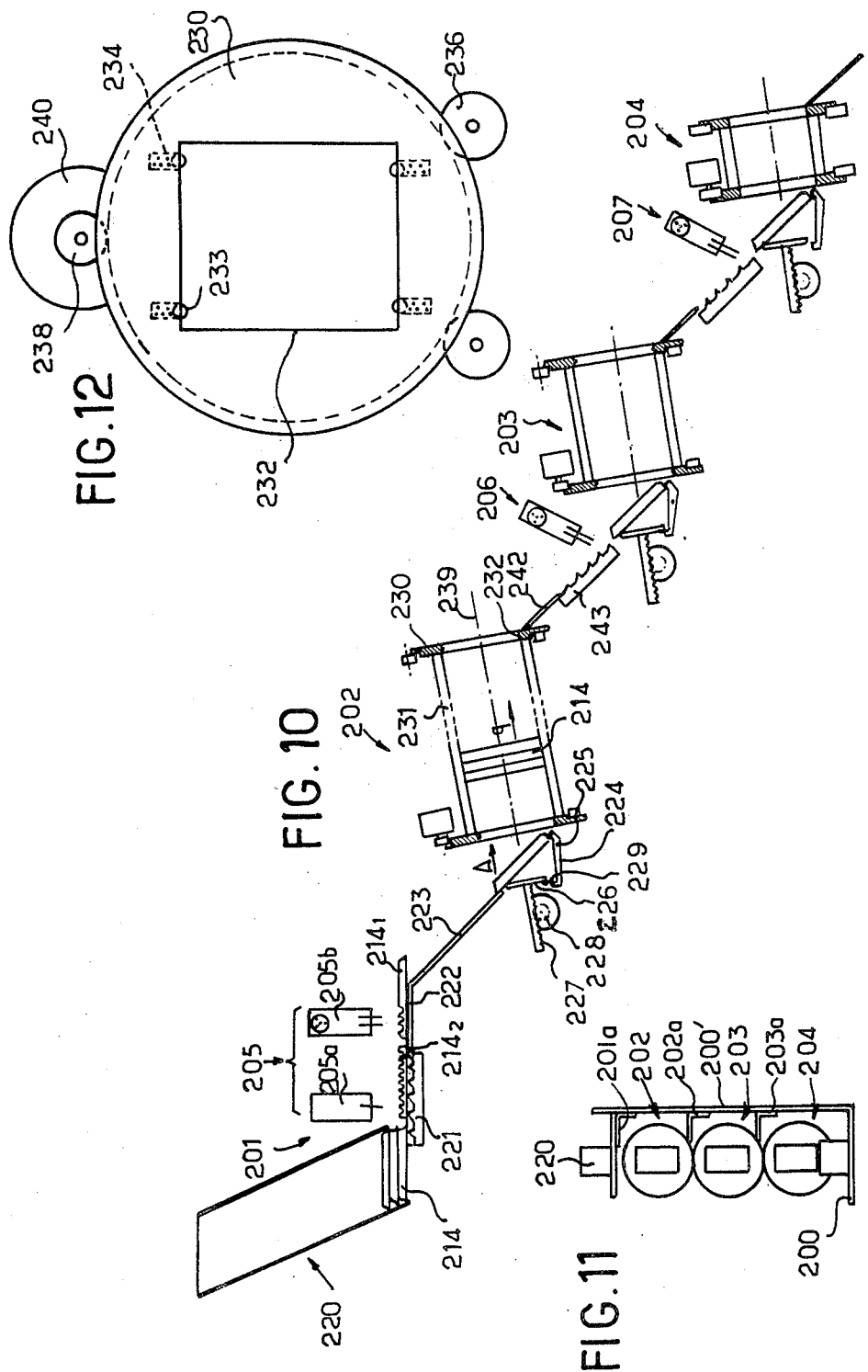

ANALYSIS APPARATUS

The present invention relates to an analysis apparatus, and more particularly, to an apparatus that can be used to carry out particle agglutination, flocculation or precipitation reactions for a liquid sample.

Generally speaking, one object of the invention is to provide such an apparatus, that is compact and simply constituted for rapidly providing a considerable amount of chemical, biochemical, immunological or analogous analytical data from a very small quantity of a sample to be analysed and analysis reagent (s). It is a particular object of the invention to provide such an apparatus that is inexpensive and can thus be acquired and used by small and medium size medical analysis laboratories.

It is also an object of the invention to provide such an apparatus whose use does not require particular analysis reagents but which, on the contrary can make use of the usual analysis reagents, particularly those used in manual analysis techniques.

It is also an object of the invention to provide such an apparatus that can be adapted, by simple conversion, to different uses and which can, in addition, be ued to carry out simultaneously analyses using different modes of photometric evaluation, such as nephelometric and fluorescence and/or absorption measurements of radiations of different wavelengths etc.

The analysis apparatus according to the invention is characterized by the fact that it includes means for transferring supports provided with a plurality of micro-containers in which the sample-analysis reagent reactions are carried out, between a sample and reagent dispensing station and a reaction medium observation station, such transfer means being designed to rotate each support whose micro-containers have received a predetermined quantity of sample for analysis and analysis reagent (s) about its axis at a predetermined velocity in a plane inclined in relation to the horizontal.

In an advantageous form of embodiment, the transfer means are organized into a general "staircase" configuration and include devices with rotary drums inclined in relation to the horizontal provided with means for guiding and maintaining the micro-container supports.

In a preferred form of embodiment, the reaction medium observation station is a device of the type described in my copending U.S. Pat. application Ser. No. 377,432, filed July 9, 1973, and which includes means for forming micro-drops from the reaction medium, or from a fraction thereof, on a support, together with means for photometrically interpreting from each micro-drop the result of the reaction or reactions between the sample and the analysis reagent or reagents.

In another form of embodiment, the observation station includes means for sampling, from each of the micro-containers, a micro-drop from the reaction medium, together with means for depositing said micro-drops on an absorbent support such as cartoline, ordinary paper or filter paper, the support then being interpreted in a known manner and constituting, if required, a record document.

In one form of embodiment of an apparatus according to the invention, with a high operaating speed and a large number of samples analysed per time unit, the photometric device is, preferably, connected to rapid recording means and/or a computing unit for interpreting and automatically attributing the analysis results for a plurality of successively treated samples.

The invention will be clearly understood by means of the following description given by way of example and with reference to the attached drawings wherein:

FIG. 1A is a perspective diagram of a constituent of an apparatus according to the invention;

FIG. 1B is a perspective diagram of an apparatus frame according to the invention;

FIG. 2A shows a detail;

FIG. 10 is an elevation diagram of another apparatus according to the invention, certain parts of which have been cut away for clarity;

FIG. 11 is an even more diagrammatic end view of the apparatus of FIG. 10 and shows the means for positioning and fitting its constituents on a base;

FIG. 12 is an end view in the direction of arrow A of FIG. 10, of a constituent device of the apparatus;

Figure 1:
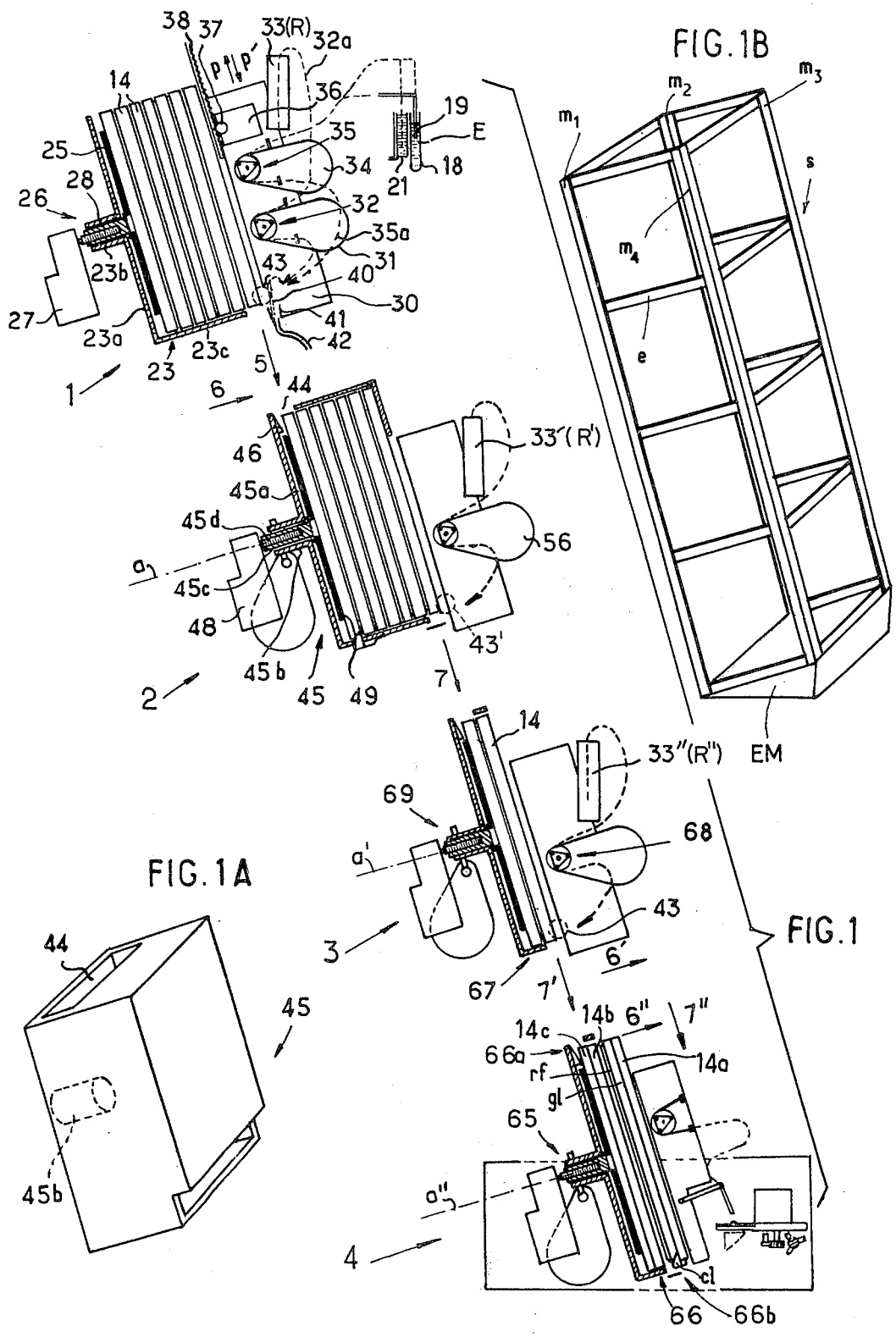
FIG. 1 is an elevation diagram of an apparatus according to the invention.

As diagrammatically represented in FIG. 1, the analysis apparatus according to the invention includes, in the form of embodiment represented, four "modular" members 1, 2, 3, 4 disposed in sequence, on a support frame S, (FIG. 1B), in a vertical configuration, i.e., wherein member 1 is above member 2, etc., the disposition of the members being suitable for modification as a function of the user's requirements, for example for undertaking $n$ analyses of N samples treated per time unit or for undertaking $n/2$ analyses of a number of 2N samples treated per time unit.

The frame S housing members 1–4 includes a base EM to which are attached uprights $m_1$, $m_2$, $m_3$, $m_4$ connected modifiably by cross-members $e$, the uprights and the cross-members as a whole defining a structure suitable for housing modular members 1–4 as drawers.

In another embodiment, the configuration of modular members 1, 2, 3, 4 represented in FIG. 1 is a configuration whereby the members are substantially in the same horizontal plane.

Figure 2:
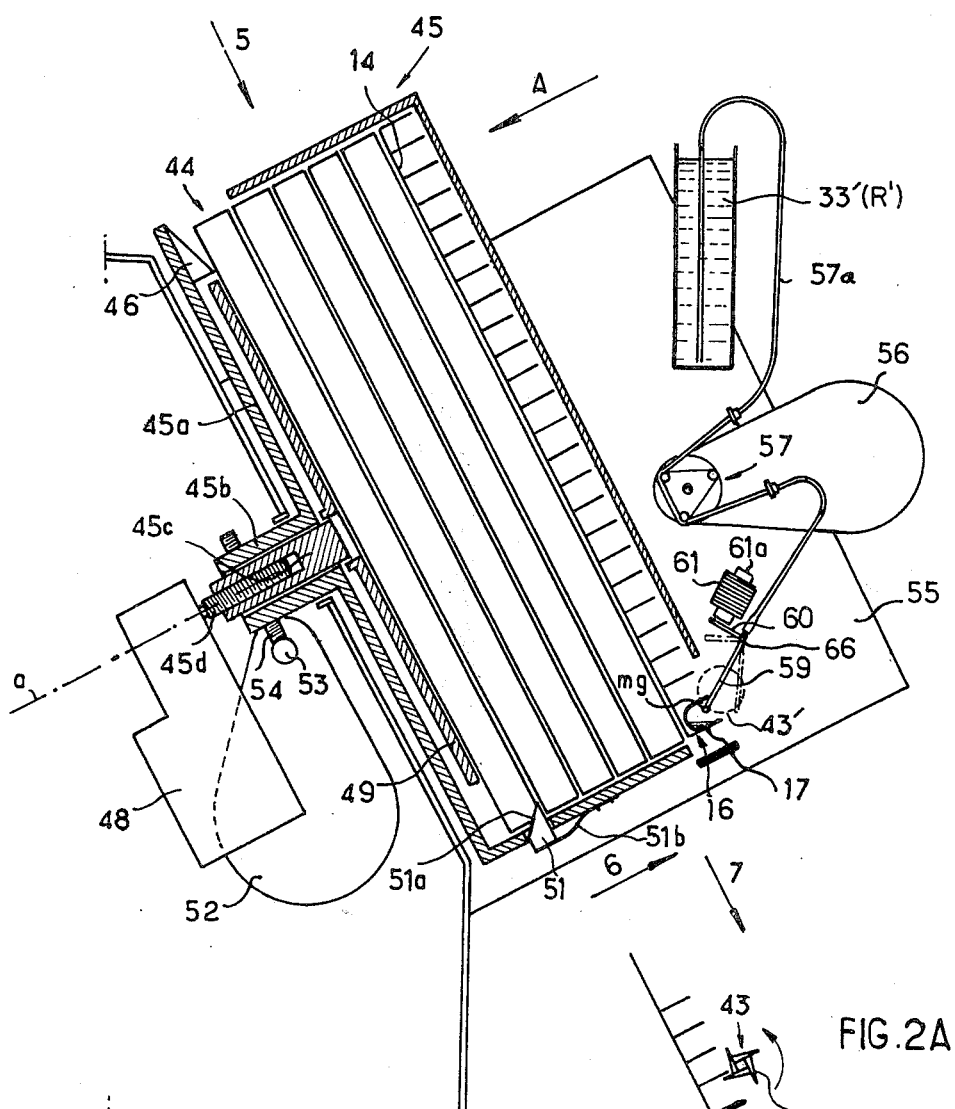
FIG. 2 is a larger scale elevation view of a reagent loading station.
Figure 9:
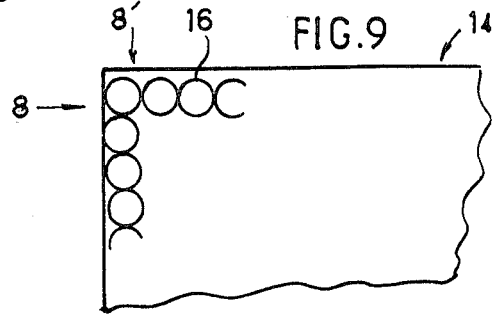
FIG. 9 is a partial top view, on a smaller scale than the previous views, of a support designed as a container holder plate suitable for equipping an apparatus according to the invention.

According to one feature of the invention, the analysis reactions take place in containers shaped to form the ends of micro-tubes 16, (FIGS. 2, 7 and 9) uniformly disposed on plates 14 in rows 8 and columns 8', said plates 14 being suitable for displacement between a sample and analysis reagent loading station 1 and a reaction medium observation station 4 by transfer means which cause them to be moved past stations 2 and 3 for loading any planned additional reagents between station 1 and station 4. At each of the stations, the plate 14 are displaced, as represented by arrows 6, 6', 6'' in FIGS. 1 and 2, between the rear face and the front face of a casing or housing which houses said plates during their staying time at each station, the entry into and/or exit of a plate 14 from a housing taking place by a translation movement in a direction at right angles to the displacement direction of the plates in the housings, as represented by arrows 5 and 7 in FIG. 2. As illustrated, the plates or supports 14 are each of a substantially planar configuration with the housings for the individual micro-containers 16 being formed by partitions extending perpendicular to the plane of the plate.

In the form of embodiment including modular members disposed one above the other, a plate tends to leave a housing of a first station and to enter an adjacent housing of a second station by gravity feed, while pusher members displace the plates in a form of embodiment having stations in the same horizontal plane.

According to an important feature of the invention, each plate carrying the micro-containers 16 is rotated, during its transfer from station 1, at least once about its axis, at a predetermined velocity in a plane at an angle to the horizontal, i.e., about an axis $a$, (FIGS. 1 and 2); located in the plane of the drawing sheet or extending parallel thereto.

The angle with respect to the horizontal is advantageously between 75° and 85° to cause lameller distribution, leading to satisfactory results, of the liquid mass held in a container. It is understood that the numeric value indicated above is given only for indicative, non-limitative purposes, satisfactory reaction medium configurations being obtained depending on the volume or the dimensions of the containers with different inclination angles than those mentioned.

Advantageously, plates 14 are rotated about their axes, as above indicated, at each of stations 2, 3 and 4, the rotation speed being selected as a function of the desired result and rotation taking place for an adjustable time period corresponding to that required for loading one plate 14 with samples and reagent(s) at station 1, such a time period being possibly in the order of 4 to 5 minutes, for example, in the non-limitative case of an 18 × 17 × 1 cm plate dimensioned to receive 624 containers constituted by micro-tube ends each having an internal diameter of approximately 6 mm and a length of about 9 mm.

In another form of embodiment, plates 14 are constituted by thin glass sheets moulded to form micro-containers each of which is analogous in shape to that of a micro-tube end.

The rotation speeds of a plate about an axis such as $a$ are for example approximately:

2.5 rpm to obtain a homogeneous mixture of the sample and the analysis reagent;

0.5 rpm to obtain settling without adherence;

0.75 rpm to bring together the agglutinated particles;

10 rpm for the re-suspension of the settled particles.

Figure 7:
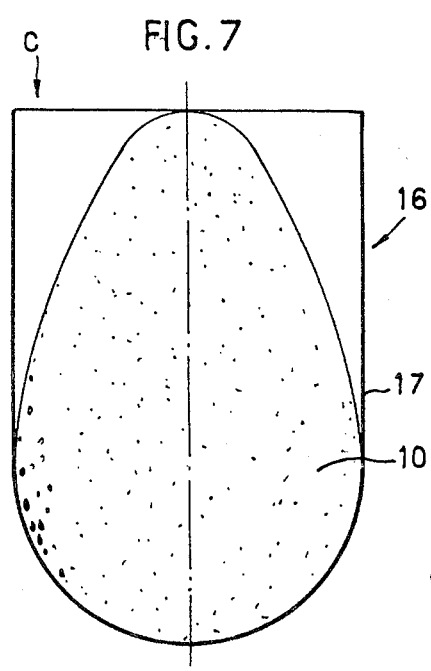
FIG. 7 is a large scale top view of a container designed as part of a micro-tube equipping an apparatus support according to the invention, in the working position of the support on the apparatus and containing a medium capable of forming agglutinates and/or precipitates.
Figure 8:
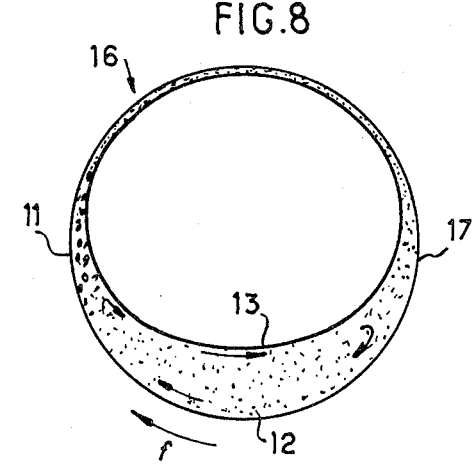
FIG. 8 is a view of the container illustrated in FIG. 7 in the direction of arrow C of this figure.

The rotation of the plate 14 about its own axis, as $a$ gives a homogeneous mixture in each micro-container of a sample to be analysed and analysis reagent, when both the media consist of a solution, while, as represented in FIGS. 7 and 8, in the case of samples for analysis and reagents, at least one of which is in the form of a cellular or particular suspension 10, rotation causes accumulation in a zone 11 of only the particles 12 that have settled. The latter, driven by the end wall of micro-tube 16 on which they rest, accumulate upstream of the liquid reaction mass, in relation to the rotation direction represented by arrow $f$, if said liquid mass takes the form of a thin film of about 1 to 2 mm and its limiting surface 13 is concave, i.e., on condition that wall 17 of microtube 16 is wettable. This settled particle accumulation effect is favourable to the agglutination of said particles if the reaction products have such a tendency to agglutination owing to their chemical or serological properties.

In the form of embodiment represented in FIG. 1, with four stacked stations, station 1 for loading plates 14 with samples and with a first series of analysis reagents includes, attached to its frame which is not represented, a fixed parallelepiped housing 23, at an angle to the horizontal, with a bottom 23a and a lateral wall 23c one of whose faces is interrupted to form an aperture for introducing plates 14 into the housing. Parallel to the bottom 23a of housing 23 extends a plate 25 rigid with a nut 28 of a screw-nut device 26, actuated by a motor reducer 27 whose actuation causes said plate 25 and subsequently one plate 14 to advance in the direction of arrow 6, for example every 4 minutes.

On a movable base 30 is mounted motor 34 of a peristaltic pump 35 whose pipes 35a are connected, on one hand, to a probe 19 for collecting a sample E for analysis housed in a tube 18 adjacent to a container 21 for flushing probe 19 and, on the other hand, to nozzles for dispensing the collected sample in micro-containers 16. Said nozzles, whose number is equal to that of the micro-containers of a row 8 of plate 14 are fitted, as will be described in detail hereafter with reference to FIG. 2, on a pivoting hanger, the abrupt stopping of which, for example by abutment against the core of an electromagnet actuating its movement, causes a micro-drop of sample that actuation of peristaltic pump 35 has previously caused to well at the extremities of the nozzles, to be deposited in all the microcontainers 16 of a row 8. A funnel 41 is placed adjacent to the lowest position of the nozzles to collect a flushing liquid taken from the constant level container 21 and discharged through a pipe 42 connected to a suction pump.

The motor 31 of a peristalic pump 32 is also attached to base 30 and its pipes 32a are connected, on one hand, to stores 33 of reagents, and, on the other hand, at their discharge extremities, to nozzles or needles 40 attached to a movable hanger constituted and functioning in a manner analogous to that described for the sample dispensing nozzles.

Base 30 also carries a two-way rotation motor 36 whose output shaft carries a gear 37 engaging with a rack 38 attached to frame of station 1 to displace base 30 supported on slides, not represented, in the directions of double arrow $p, p'$.

Motor 36 discontinuously displaces base 30 in the direction of arrow $p$, by an increment equal to the center-to-center distance of micro-containers 16 in two adjacent rows 8 on plate 14, the time interval between two succeeding displacements of base 30 being equal to the time required to fill all the micro-containers in one row with the same sample, to flush the nozzle of the sampling probe, the dispensing nozzle and to fill the micro-containers of one row with analysis reagents, i.e., in one form of embodiment, approximately 10 seconds.

When a plate 14 is completely filled with samples, two ratchet wheels 43, (FIG. 2A), driven by motor 31 through a suitable kinematic chain, displace loaded plate 14 downwards in the direction of arrow 5, by the engagement of teeth 43a of said wheels in the non sampled-filled micro-containers 16 of the two end columns 8' of a plate 14, the action of ratchet wheels 43 continuing until the introduction of plate 14 loaded at station 2. During the downward movement of plate 14, under the action of ratchet wheels 43, pump 32 and the means associated with nozzles 40 add to the samples contained in micro-containers 16 micro-drops of a first series of reagents R contained in stores 33.

Station 2, for filling micro-containers 16 with a second series of additional reagents R' includes a housing 45 into which a plate 14 from station 1 penetrates through one slot 44 in the lateral wall, (FIG. 1A), and in which it is guided by a member 46. In housing 45, (FIG. 2), parallel to its bottom plate 45a from the center of which runs a tubular appendix 45b, is disposed a plate 49 rigid with a tapped member 45c sliding in appendix 45b and which engages a threaded rod 45d which forms the extremity of the output shaft of a motor 48.

On one of the lateral faces of housing 45, and projecting within it, are provided pawls 51 each with a bevelled face 51a opposite bottom 45a and biased by resilient means 51b attached to said face.

In an alternative form of embodiment, the rotation of motor 48 is controlled so as to displace the set of plates 14, by the height of a half plate in the direction of arrow 6, so that the lower plate is locked in the housing without it being possible for the plate on the lower face to escape.

Figure 3:
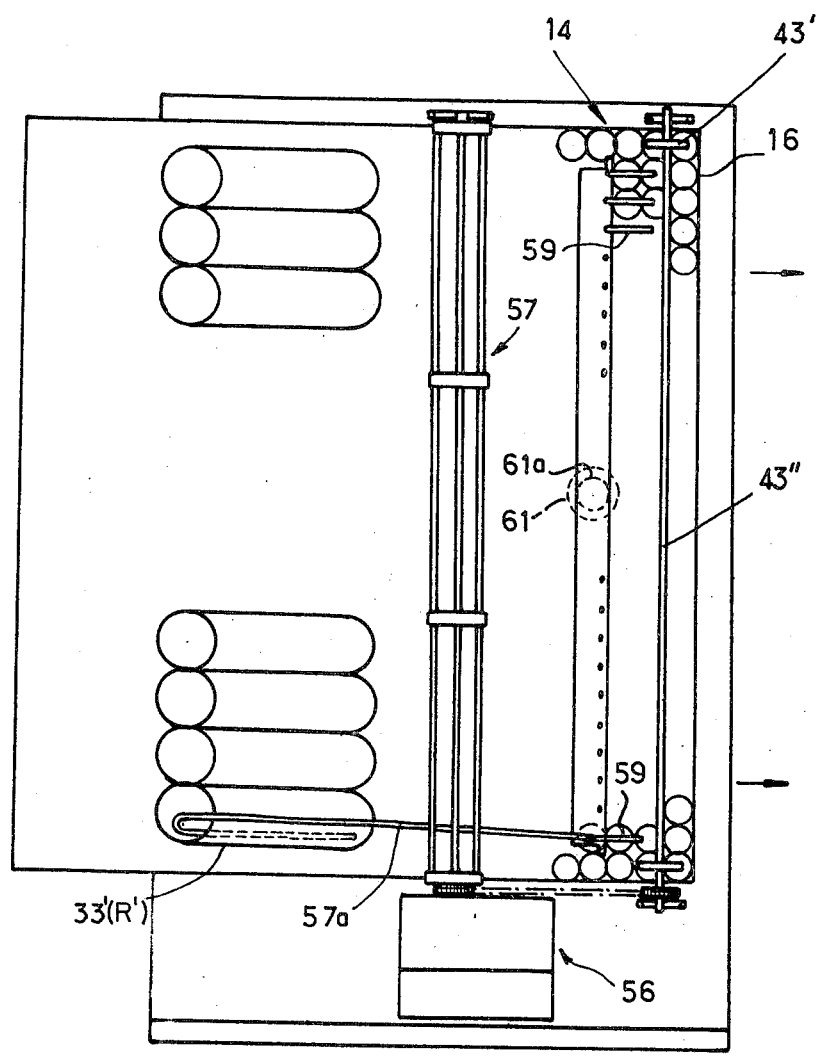
FIG. 3 is a view in the direction of arrow A of FIG. 2.

The tubular appendix 45b is surrounded by a gear 54 rigid therewith and whose teeth engage the teeth of a worm screw 54 forming the output shaft of a motor 52 attached to a plate 55 integral with the frame of station 2 and which additionally bears a motor 56 of a peristaltic pump 57 whose pipes 57a, whose number is the same as that of micro-containers 16 of a row 8 of a plate 14, are connected, at one of their extremities, to stores 33' of analysis reagents R' (FIGS. 2 and 3), and to the upper extremities of which are connected nozzles 59, of which there are as many as there are micro-containers 16 in a row 8. Nozzles 59 are carried by a strip 60 biased by elastic means, not represented, which maintain it with nozzles 59 in the position represented by a dot and dash line in FIG. 2, while as an electromagnet 61 rigid with plate 55 is energized, strip 60 pivots about a pin 66 from the position represented in dot and dash lines to that represented in continuous lines. The end of the pivoting movement, caused by abutment of strip 60 against the core 61a of the electromagnet or by abutment of nozzles 59 against lateral wall 17 of micro-containers 16, causes micro-drops $mg$ that operation of peristaltic pump 57 has previously caused to well at the extremities of said nozzles to drop into said micro-containers.

Ratchet wheels 43', mounted on a retractable shaft 43'' and driven from a motor 56 by a suitable kinematic chain, analogous to the ratchet wheels 43 of station 1, impart a stepwise translation movement to plate 14 in the direction of arrow 7 to bring adjacent rows 8 of micro-containers 16 successively opposite nozzles 59 and also to introduce a plate 14, whose micro-containers 16 have been filled with reagents R' into a station 3 identical in structure to station 2 and comprising stores 33'' of reagents R'' dispensed by a peristaltic pump 68, a housing 67 for receiving plates 14 together with means 69 for causing a plate 14 to be successively displaced in the directions of arrows 6' and 7' and also to cause said plate to rotate about its axis $a'$ parallel to direction 6' and extending in the plane of the firgure or parallel thereto.

On leaving station 3, plates 14, — whose micro-containers 16 have been successively filled with samples and reagents R at station 1, with reagents R' at station 2 and reagents R'' at station 3 —, are introduced by ratchet wheels 43 of station 3, analogous to ratchet wheels 43' of station 2, into a housing 66 of observation station 4. The latter comprises a first portion 66a whose structure is identical to that of stations 2 and 3, with means 65 suitable for causing plates 14 to be displaced in the directions of arrows 6'' and 7'' and also suitable for causing each of said plates to rotate about its axis $a''$ extending parallel to the direction of arrow 6'' and located in the plane of the figure or parallel thereto. Adjacent to portion 66a is a portion 66b organized to enable the step-by-step displacement, for example every 10 seconds, of leading plate 14a in the direction of arrow 7'', while the plate or plates 14b, 14c, in portion 66a are rotated for, e.g., 4 minutes. Portion 66b includes two fixed rails $rf$ for guiding slides $gl$ bearing catches $cl$ for maintaining plate 14a (FIG. 4) and which, after said plate has left station 4, resume their initial position wherein they are suitable for receiving and supporting the following plate 14 that is rotated about its axis by means of portions 66a and then displacing it in the direction of arrow 6''.

In a simplified form of embodiment of the apparatus, reaction observation at station 4 is carried out directly by the user, with the naked eye, or using a lens.

However, in a preferred form of embodiment, the result of the reactions is photometrically evaluated and, in this case, the measuring means applied can advantageously be of the types decribed in my above-said U.S. Pat. application Ser. No. 377,432, i.e., comprising means for depositing micro-drops of reaction media on zones of a support transparent to radiation, whereon said micro-drops are firmly maintained in a stable, reproducible geometric configuration, together with sensors responsive to radiation from a micro-drop illuminated by a ray of predetermined wavelength after the luminous flux from the microdrop has been collected by suitable optical means.

Figure 4:
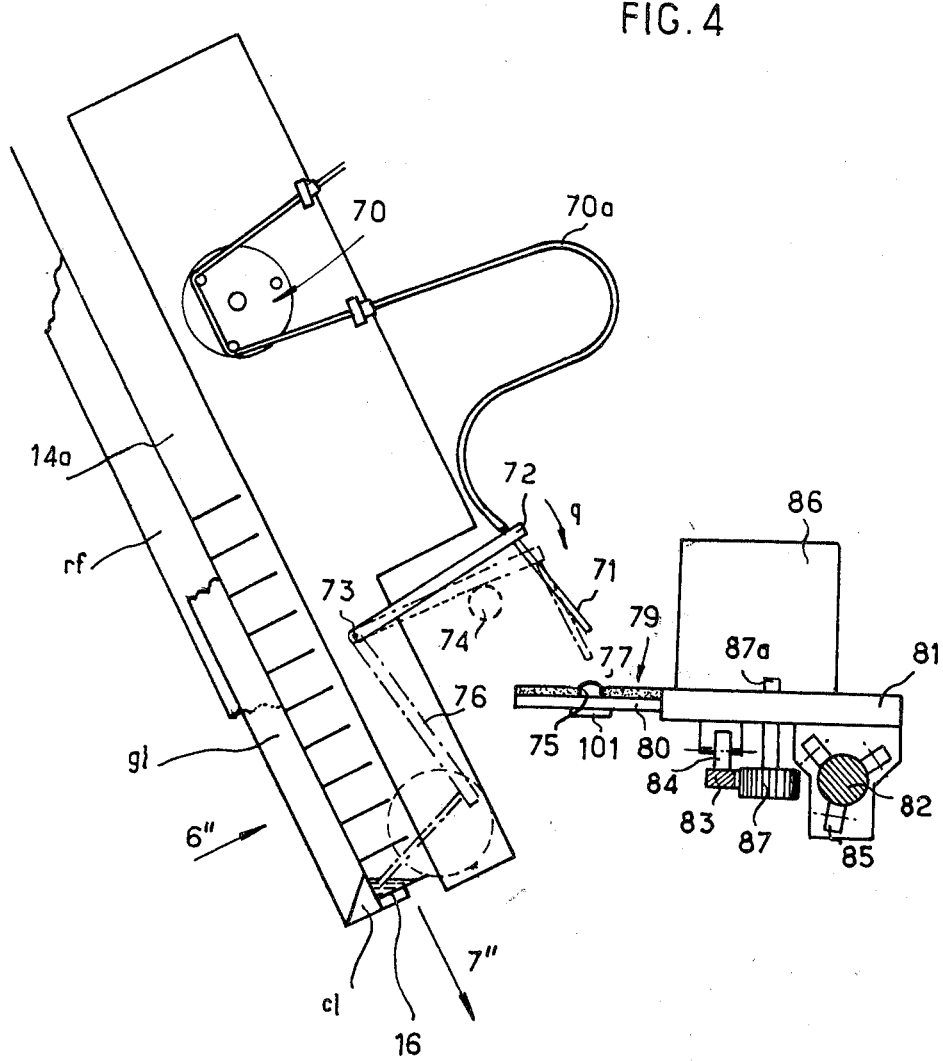
FIG. 4 is an elevation view of a portion of the result observation station.
Figure 5:
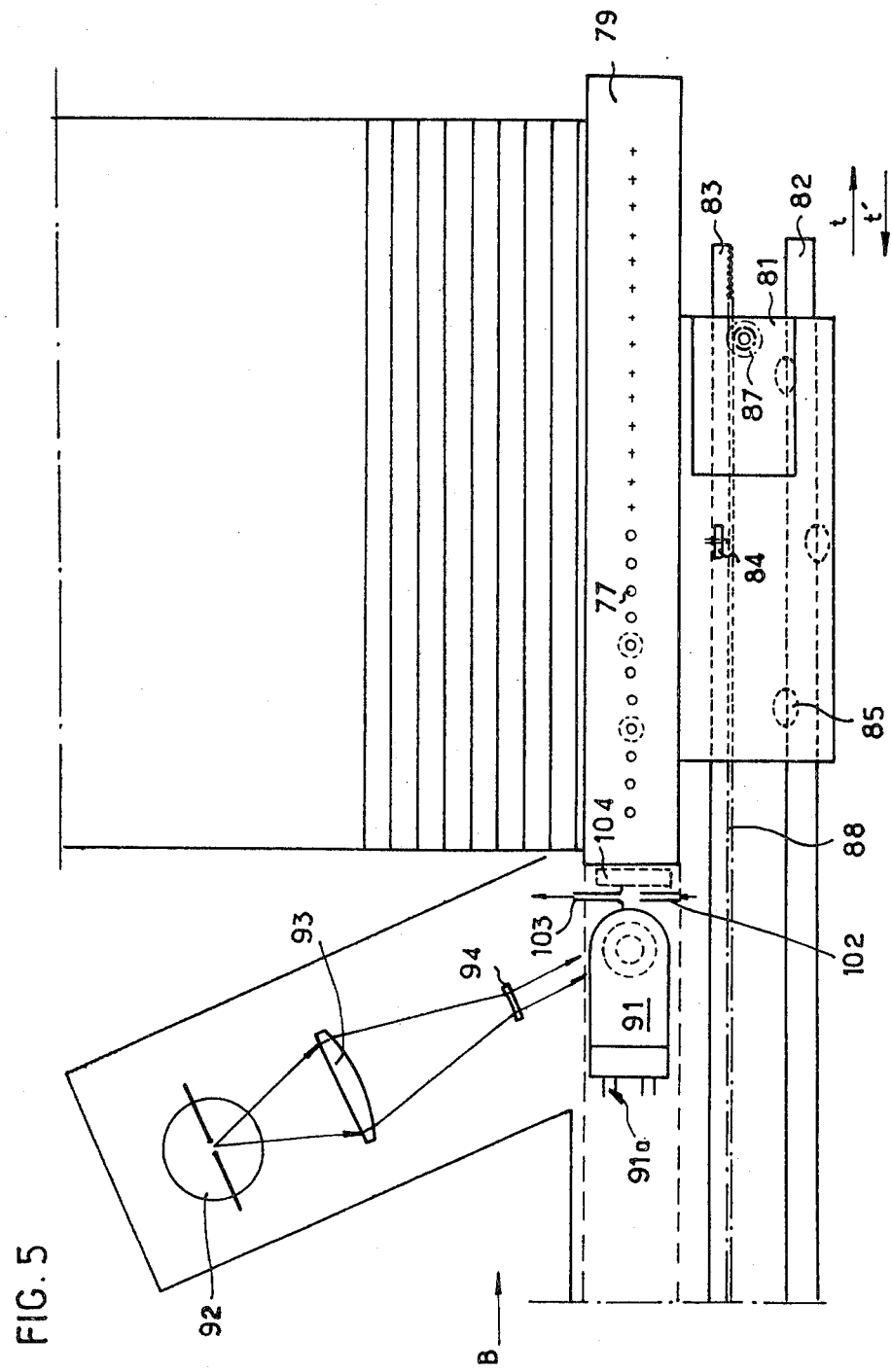
FIG. 5 is a diagram of a photometric device of an apparatus according to the invention.
Figure 6:
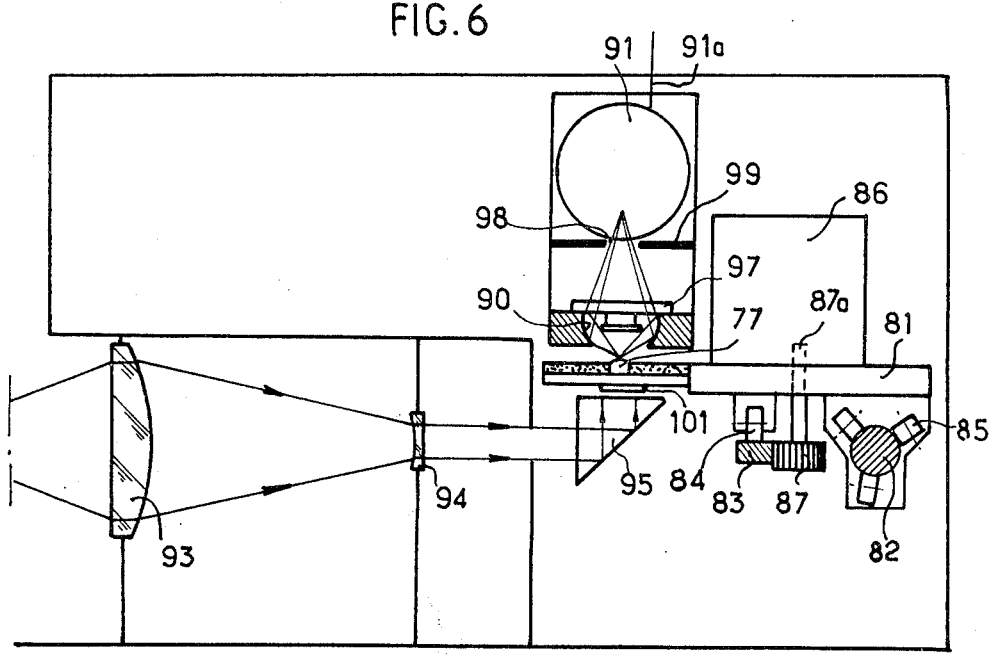
FIG. 6 is a view in the direction of arrow B of a device illustrated in FIG. 5.

In the form of embodiment represented (FIGS. 4, 5 and 6), a two-way rotation peristalic micro-pump is associated with the photometric device properly speaking (FIG. 4), and its pipes 70a, which are as numerous as the micro-containers 16 of a row 8 of a plate 14, are connected by one of their extremities to nozzles 71 for collecting the reaction media, attached to a hanger 72 mounted about a pin 73 and pivoting between position represented in unbroken lines and a position 76 represented in dot dash lines in FIG. 4 wherein nozzles 71 are immersed in the reaction media contained in the micro-containers 16. From this latter position, the rotation in a first direction of peristaltic pump 70 causes a given volume of the reaction medium held in micro-containers 16 to be collected. When hanger 72 has returned to its top position, it again pivots in the direction of arrow g and abuts against a retractable stop 74; the abrupt stop of the pivoting movement causes micro-drops 77 of reaction medium that a rotation of pump 70 in a direction opposite to the previous rotation direction and with a smaller rotation angle has caused to well at the extremities of nozzles 71, to be deposited on a platelet 79 in which are provided reaction zones 75.

In plate 79, including a substrate 80 transparent to radiation overlaid by a layer opaque to said radiation, covered, if necessary, by a film of a silicone base material, the reaction zones 75 take the form of alveoles with a diameter of between 1 and 6 mm, for a depth of a few tenth of a millimeter, and at which the radiation opaque layer is interrupted. The edge of each alveole is either sharp or ragged, or rounded to form, — in combination with the silicone layer and through the interaction of surface tension, hydrophobic zones, hydrophilic points and the ratio of the total volume of reaction medium liquids to the volume of the alveole, 13 a micro-drop 77 constituting a liquid optical system with a symmetry axis which, through the combined effects of the weights and geometry of the system, is firmly maintained, that is, anchored, on platelet 79. The latter is rigid with a carriage 81 performing a translation movement in the directions of arrows t and t' (FIG. 5), which is displaced on bars 82 and 83 with ball bearings 84 and 85 interposed, bar 83 carrying a rack 88 which engages a gear 87 attached to the extremity of shaft 87a of a motor 86.

Carriage 81 (FIG. 6), is designed to cause micro-drops 77 deposited on platelet 79 by nozzles 71 to move past optical means including a source 92, such as a continuous spectrum lamp or an arc lamp, a lens 93, a collimator 94 and a light return member, such as a prism 95 whose emitted beam constitutes the beam illuminating the micro-drops 77 during examination. The luminous flux from said micro-drop is treated by a focussing system, such as a set of lenses, Fresnel lenses or mirrors for transmission to a photomultiplier 91. When the focussing system is an elliptical mirrow 90, micro-drop 77 is placed at its object point while, at its image point, is placed photomultiplier 91. Adjacent thereto, on the path of the flux transmitted by mirrow 90, is interposed a screen 99, whose window 98 delimits the field of the image received by the photomultiplier, a filter 97 adjacent to mirror 90 and an opaque circular screen inside said mirror also being provided when the photometric measurements are nephelometric or fluorescence measurements.

In an alternative form of embodiment, not represented, a lens system with a relatively wide angle forms the image of the elliptical mirror 90 on photosensor 91. In this form of embodiment, the opaque screen inside the mirror is advantageously pierced by an orifice covered with a flux compensating absorbent filter whose lens also forms the image on the same photosensor, when the latter is a photographic film or on a second sensor when the latter is not a film. A central circular image is thus simultaneously obtained enabling the flux transmitted by reaction micro-drops 77 to be measured, said image being surrounded by an annular image enabling the flux diffused by fluoresence re-emission by the reaction mixture to be measured.

According to another improvement of the invention, plate 79 comprises opposite reaction zones 75, but on the face of substrate 80 not in contact with the reaction medium, one or more radiation filters 101 enabling the characteristics of the reaction medium to be determined on a predetermined radiation frequency spectrum.

The output 91a of photo-multiplier 91 is connected to any suitable recording device, or to a data processing unit supplying the desired analysis results from photometric reading of all the characteristics of the reaction media of the micro-drops during the displacement movement of carriage 81 in the direction of arrow t. After reading, a rapid return of carriage 81 in the direction of arrow t' brings reaction zones 75 adjacent to nozzles 71, said zones being moved past a horizontal tube 103 connected to a suction source and a tube 102 connected to a blower means for cleaning plate 79.

If necessary, a retractable roller 104 applies to plate 79, during its return phase only, a fresh layer of silicone base material whose presence assists in maintaining the deposited micro-drops in a stable reproducible geometric form.

The apparatus functions as follows:

After loading housing 23 of station 1 with plates 14 filled with micro-containers 16, the apparatus is switched on. When the presence of a plate 14 is detected on the front face of housing 23, by means of a feeler not represented, a programmer, also unrepresented, causes probe 19 to be immersed in a sample tube 18 and also causes the rotation of motor 34 actuating pump 35 to suck in a volume of sample E for analysis. The peristaltic pump 35 is then stopped and probe 19 which has been raised is laterally displaced to the flushing container 21 in which an appropriate mechanism immerses it. Further actuation of pump 35 causes the previously collected sample volume to pass through pipes 35a to bring it adjacent to the dispensing nozzles connected to said pipes. The flushing liquid, with which pipes 35a might have previously been filled, in the neighbourhood of the dispensing nozzles, flows through said nozzles into fixed funnel 41 from which it is gravity fed or sucked by means of pipe 42.

A further fraction of rotation of pump 35 causes micro-drops to well at the extremity of each of the sample dispensing nozzles, but they are not detached until the strip carrying the dispensing nozzles is abruptly stopped in its pivoting movement, for example by abutment against the core of a control electromagnet or by the abutment of the nozzles against wall 17 of microcontainer 16. When this abrupt stop takes place, the micro-drops are deposited in micro-containers then, after the strip has been returned to its position wherein the sample dispensing nozzles overhang funnel 41, the programmer successively actuates first pump 35 for a few seconds, which causes pipes 35a to be flushed, then motor 36 to displace base 30 and the means that it carries in the direction of arrow p. When the position at which the sample dispensing nozzles are capable of filling the row of micro-containers 16 immediately adjacent to that which has just been filled has been reached, pump 35 having stopped, probe 17 emerges from flushing container 21 and is again brought to plunge into a new tube 18 containing the next sample E' to be analysed. The above described cycle, which causes one row of a plate 14 to be filled with a sample and which lasts, for example, about 10 seconds, is then again actuated by the programmer.

When the entire plate 14 is loaded with samples, which, on the basis of the numerical values above indicated, takes place in 240 seconds, the ratchet wheels 43 of station 1, actuation of which is governed by an order from the programmer, drive said plate 14 loaded with samples in a translation movement in the direction of arrow 5, this being in a stepping movement, pump 32 being operative during the immobilization periods of plate 14 to bring reagents R contained in stores 33 into micro-containers 16.

In an example of embodiment, the micro-containers 16 of a row 8 are filled with reagents every one-half second and the movement of a plate 14 in the direction of arrow 5 is actuated every one-half second, i.e., filling the micro-containers 16 of a plate 14 with reagents in 12 seconds.

When a plate 14 filled with samples and reagents R has completely left housing 23 of station 1 and is engaged in housing 47 of station 2, motor 27 rotates the screw of the screw-nut device 26 of station 1 to bring a new plate 14 to filled with samples and reagents R onto the front face of housiing 23.

Throughout the time taken to load plate 14 at station 1 with samples, all plates 14 contained in housing 45 of station 2 are driven in rotation about axis $a$ by motor 52 in order, as above indicated, either to cause the reagents plus samples to be correctly mixed, or to favour settling on without adherence, or to collect together the agglutinated particles, or again to re-suspend the particles that have settled.

At the end of a first rotation period of housing 45, the programmer actuates motor 48 which, by displacing plate 49 in the direction of arrow 6 displaces plate 14 that it carries by retracting pawls retaining said plate 14 immediately after it has passed thereover. The actuation in the opposite rotation direction of motor 48 causes plate 49 to return to its position adjacent to the bottom 45a of housing 45 to provide a space for receiving a plate 14 introduced into housing 45 by the action of ratchet wheels 43.

After a rotation period of housing 45 of station 2, the latter is immobilized to enable micro-containers 16, already holding the samples to be analysed and reagents R, to receive, if necessary, micro-drops of reagents R' contained in stores 33' in an analogous way to that above described, i.e., during the displacement movement in the direction of arrow 7 of a plate 14, driven by ratchet wheels 43'.

When a plate 14 leaves station 2, it is filled in an identical way with reagents R'' at station 3 where plate 14 is also rotated at least once about its axis $a'$ outside the periods during which the plate is loaded with said reagents R''.

An analogous process takes place at station 4 to bring plates 14 received from station 3 opposite the means associated with the photometric device whose functioning has been described above.

At this station, nozzles 71 and pipes 70a of the two-way rotation peristaltic pump 70 are flushed in a way known per se between two successive reaction medium collecting operations, by the circulation of a flushing liquid by a rotation of the pump in a direction opposite to that used for collecting the reaction media. In addition, and to prevent the flushing liquid from being introduced into the reaction media, pivoting and abrupt stopping of hanger 72 is operated at the end of flushing to withdraw from nozzles 71 any flushing liquid drops that might be maintained therein, said drops being recovered in a funnel device not represented.

The invention is not limited to the mechanical means described and represented. Hence, in place of screw and nut devices for displacing the plates at each of the stations, eccentric or cam type device could be used. Similarly, plate rotation drive, at stations where such rotation is provided for, can be by means of friction rollers and not of a set of gear wheels and gears.

Similarly, ratchet wheels such as 43' can be replaced by anchor type escapement means, chains provided with drive pins, or, alternatively, by stop means suitable for retraction by any electric, electropneumatic or analogous control system to allow a support plate to pass from one station to the next.

The apparatus according to the invention can be used to carry out a great number of analyses, in particular medical analyses, such as haematological, biological, chemical or immunological analyses.

Thus for example, glutamate oxalo-acetate transaminase (GOT) can be quantitatively batch fed into the blood stream for biologically diagnosing myocardia infarct or certain hepatites. In this batching, which makes use of photometric fluorescence measurements, it is the decrease of fluorescence that is a function of the quantity of GOT present in the sample that is determined.

Another example of application is that of detecting the presence of irregular agglutining in the blood stream of pregnant women or blood donors by application of a red blood corpuscles agglutination reaction in which the reagent is suspended in a mixture of group O red blood corpuscles having all the antigens corresponding to the antibodies that it is desired to detect and which, added to a sample of plasma from the patient to be examined, makes it possible to conclude in the presence of at least one irregular agglutinin if the reagent red blood corpuscles are agglutinated.

This agglutination leads to a decrease in the cloudiness of the suspension of reactive red blood corpuscles which is nepholemetrically measured.

With reference now to FIGS. 10 to 15 concerning another form of embodiment of an apparatus according to the invention, in this form of embodiment, the analysis apparatus according to the invention includes four "modular" members 201, 202, 203, 204, disposed in succession on a frame or base 200 (FIGS. 10 and 11) carrying a vertical perforated metallic plate 200' onto which can be attached angle brackets or the like, as diagrammatically represented at 201a, 202a, etc., which carry members 201, 202, etc. Member 201 is offset in relation to member 202, both as regards height and the longitudinal direction of the apparatus, said member 202 being itself offset in relation to member 203 as regards height and the longitudinal direction of the apparatus, so that said members are in a "staircase" configuration.

The analysis reactions take place in containers 216, (FIG. 13), uniformly disposed in rows and columns on a plate 214. The latter can be, for example, of the type known under the name of "microtiters" i.e., of moulded plastic material providing containers 216. The plates are suitable for displacement, between the input of member 201 which includes a device 205 for loading containers with samples and analysis reagents and a station, not represented, for observing the reaction media, by transfer means which causes them to be moved past devices 206 and 207 for loading any additional reagents planned for, respectively between members 202 and 203 and between the latter and member 204.

At the input of member or station 201, the empty plates 214 are stached in an inclined chute 220 from which they are extracted, one by one, by a rack device 221 which displaces them step by step beneath device 205 constituted by means 205a for dispensing samples and means 205b for dispensing reagents into the containers 216, plates 214 which rest, beneath means 205b, on a plane surface 222, plate 214a which rests on said surface being pushed by plate $214_2$ during sample loading in proportion as rack 221 displaces the latter step by step.

Between member or station 201 and member or station 202, the plates 214 which leave station 201 with containers 216 filled with samples and reagents are guided by an inclined plane 223 until they abut against a retractable stop 224, pivotally mounted about a pin 225, and whose pivoting is prevented as long as a pusher member 226, rigid with a rack rod 227 suitable for being moved by a gear 228, cooperates with a spring blade 229 carried by the rear arm of stop 224. Pusher member 226, whose upper portion is shaped to form a return member 226' suitable for engaging with a groove separating two adjacent rows of containers 216 of a plate 214, (FIG. 13), is opposite and in the axis of the end flange 230 of unit 202.

Figure 13:
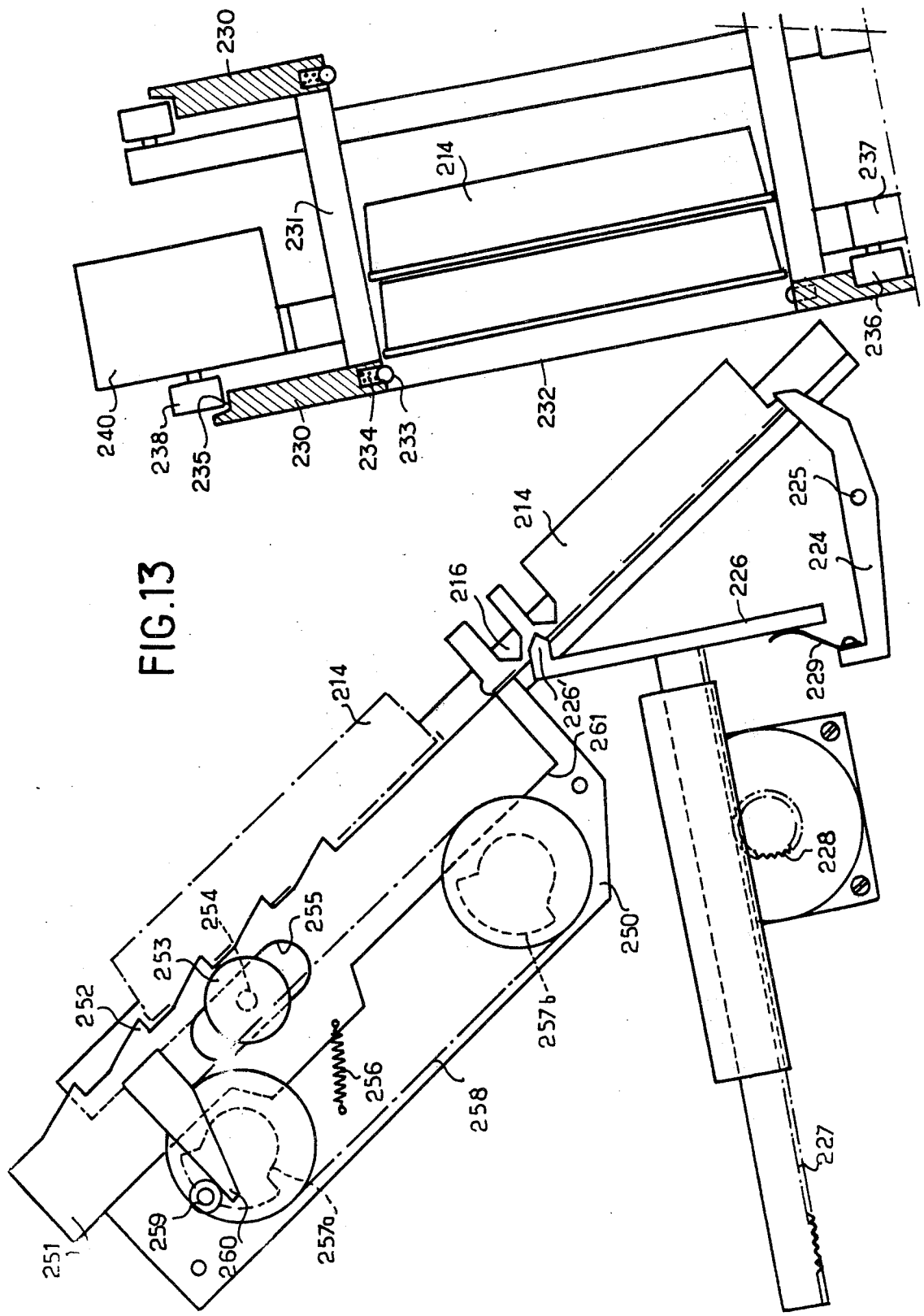
FIG. 13 is a partial elevation on a larger scale of a portion of the apparatus represented in FIG. 10.

The latter, as well as unit 203 and unit 204, is constituted by two flanges identical to flanges 230 which are interconnected by spacer members 231, each of the flanges with a circular outer contour having an opening 232 whose form matches that of plate 214 and opposite which are provided stop means that can be retracted and constituted, most simply, by four balls such as 233, biased by springs 234 (FIG. 10). As represented in FIG. 13, each of flanges 230 has on its periphery a shoulder 235 delimiting a circular track; with this track cooperate, on one hand, guide rollers such as 236, rotatably mounted on a frame 237 and, on the other hand, a roller 238 provided with a rubberized or analogous ring for driving in rotation about its axis 239, through a motor 240, the drum constituted by flanges 230 and spacer members 231.

At the downstream extremity of member 232, in the displacement direction of plates 214, which is as represented by arrow g in FIG. 10, another inclined plane 242 is provided, which guides plates 214 towards unit 203, the displacement of a plate 214 on inclined plane 242 being braked by flexible springs, not represented.

After inclined plane 242, the apparatus comprises a rack devide 243, analogous to device 221, for the stepping displacement of plate 214 coming from member 202 under device 206 for introducing additional reagents into containers 216. The rack device 243 comprises, on a plate 250, (FIG. 13), a strip 251 with teeth 252 maintained in contact with plate 250 by a flat head rivet 253 whose shank 254 passes through an orifice 255 of strip 251 which is biased by a return spring 256 and two eccentrics 257a and 257b rotatably mounted on plate 250 and interconnected by a drive chain 258 driven by a motor not represented. Excentric 257a bears a stud 259 which, at each revolution of said excentric, engages a lug 260 attached to strip 251 to displace the latter parallel to itself at the same time as it is lifted by eccentrics 257a and 257b cooperating with the lower edge 261 of strip 251, so that the plate 214 is displaced step by step.

Figure 15:
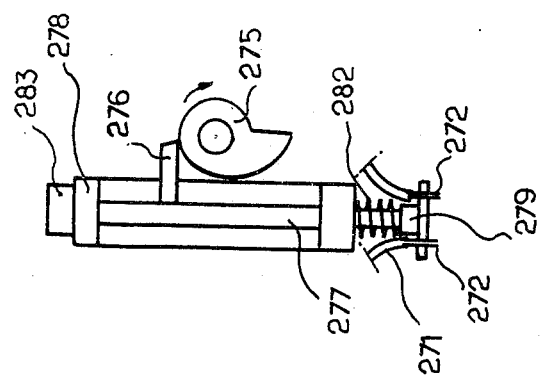
FIG. 15 is a view of the device illustrated in FIG. 14 in the direction of arrow B.
Figure 14:
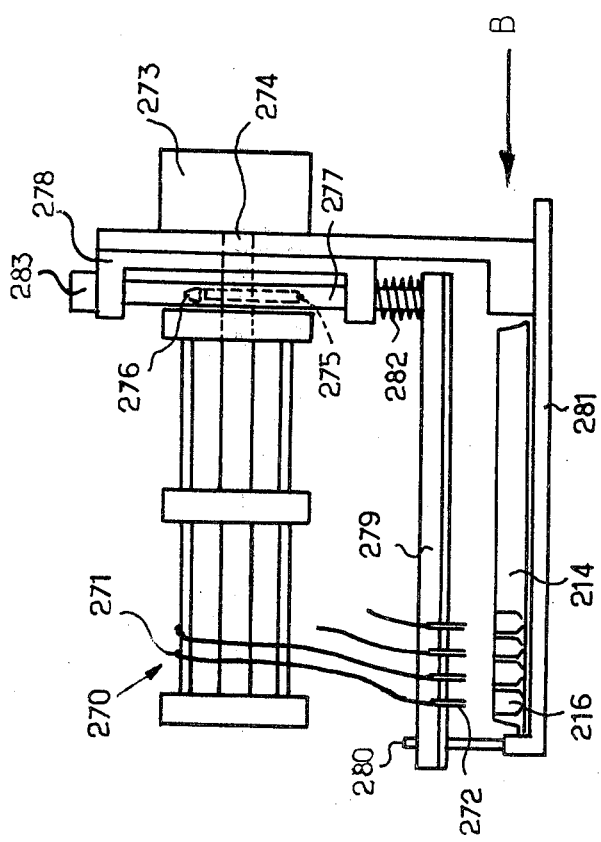
FIG. 14 is a side view of a device of the apparatus.

The analysis reagent dispensing devices such as 206, 207, etc., are advantageously as represented in FIGS. 14 and 15, i.e., include a peristaltic pump over the rotor 270 of which are stretched pipes 271 connected to probes 272 for dispensing the reagents in containers 216 of plate 214. Rotor 270 is driven in rotation by a motor 273 whose shaft 274 carries a cam 275 cooperating with a finger 276 rigid with a unit 277 rotatably mounted on a U-shaped frame 278, unit 277 comprising a bar 279 in which are mounted probes 272 and which is guided at its extremity by a column 280 rigid with base 281 on which plate 214 rests. A spring 282 is interposed between bar 279 and the lower arm of frame 278. During the rotation of motor 273, the liquid reagents are sent through pipes 271, cam 275 raising movable unit 277 against the bias of spring 282 and, when the cam escapes from finger 276, the unit abruptly drops down again under the bias of spring 282, its movement being limited by abutment against a stop 283 which is rigid therewith on the upper portion of frame 278: the abrupt stop resulting causes drops or micro-drops that the peristaltic pump has caused to well at the extremities of said probes 272 to be projected into containers 276 opposite probes 272.

The apparatus functions in an analogous manner to that of apparatus according to FIGS. 1 to 9.

After containers 216 have been loaded at station 201 with samples for analysis and the first analysis reagents, plates 214 are rotated in the drum of station 202 at the suitable rotation speed for the analysis to be carried out which may, for example, be comprised between 0.5 rpm to obtain settling without adherence and 10 rpm for the re-suspension of the settled particles.

Between its successive rotation phases, the drum of station 202 is immobilized to enable a new plate 214 coming from station 201 to be introduced by pusher member 206 after stop 224 has been retracted. The introduction of this new plate into the drum displaces the stack of plates 214 that it contains in the direction of arrow g which actuates the extraction from said drum of a plate 214 which has already performed the rotation or rotations required at station 207. Said plate, guided on inclined plane 242, is then loaded with additional reagents by device 206 under which it is displaced stepwise by rack 243.

Plate 214 thus loaded with new reagents is then introduced by a pusher member analogous to pusher member 226 into the rotary drum of member 203 when the latter is immobilised between two successive rotation phases.

Introduction of plate 214 in the rotary drum of station 203 causes the departure of a plate already rotated at this station and the containers of said plate are, if necessary, again loaded with reagents by device 207 under which they move stepwise.

After a further rotation of plates 217 at station 204, each plate 214 is individually brought to the output station of the apparatus where the analysis results are determined automatically or otherwise, as indicated above.

I claim:

1. Analysis apparatus comprising a sample and reagent dispensing station at which reaction media are dispensed; a reaction observation station at which reaction taking place between said sample and said reagent can be observed; a plurality of supports of planar configuration, each said support including a plurality of micro-containers for individually receiving, at said dispensing station, a predetermined quantity of liquid sample to be analysed and a predetermined quantity of liquid analysis reagent; and transfer means for transferring said supports from said dispensing station to said reaction observation station, said transferring means including means for supporting each said support so that the plane of the support forms an acute angle with respect to the vertical and for imparting to each said support a low speed rotation in said plane about an axis of rotation perpendicular to the plane of said support.

2. Apparatus according to claim 1 comprising, between the first sample and reagent dispensing station and the reaction medium observation station, at least one station for loading the micro-containers with additional analysis reagents, said station comprising a removable, interchangeable modular unit.

3. Apparatus according to claim 2 wherein the transfer means include, at each station, a housing designed to receive a plurality of micro-container supports, each said housing being driven in rotation about an axis perpendicular to one face thereof, and a support pusher means for conveying the supports in said housing from said face to the opposite face.

4. Apparatus according to claim 1, wherein said acute angle is in the range from about 5° to 15°.

5. Analysis apparatus according to claim 1, wherein the means for transferring the supports from said dispensing station to said reaction observation comprises a plurality of rotary drum devices disposed in a staircase configuration with the axis of rotation of each drum device forming an acute angle with respect to the horizontal, said drum devices being offset with respect to one another vertically and along the horizontal, and each said device comprising means for maintaining a multiplicity of said supports in parallel relationship to one another.

6. Apparatus according to claim 5, wherein the transfer means comprise rack means, disposed between the output side of one drum device and the input side of the following drum device for advancing the micro-container supports in a stepwise manner beneath reagent dispensing devices.

7. Apparatus according to claim 6 wherein the transfer means include, at the input side of a rotary drum device, a pusher device for introducing a micro-container support into said drum device when the latter is immobilized between two successive rotation phases.

8. Apparatus according to claim 6, wherein the photometric device includes a radiation source, optical means for transmitting the flux from said source through each micro-drop of reaction medium and focussing means for concentrating the rays emitted by the micro-drop on a photosensitive sensor.

9. Apparatus according to claim 6, wherein the observation station includes means for cleaning the reaction zones of a plate, after the plate, loaded with reaction media, has moved past the photometric device and prior to the re-charging of said zones with fresh reaction media.

10. Apparatus according to claim 1 wherein said sample and reagent dispensing station includes dispensing means for depositing a drop of reaction medium on a plate having at least one reaction zone comprising an alveole of precisely defined depth and shape and said reaction observation station includes photometric means for evaluating the results of the sample reagent reaction.

11. Apparatus according to claim 10 wherein means for flushing the pipes of the pumps and the nozzles and for sampling the reaction media in the micro-containers are provided at the observation station.

12. Apparatus according to claim 10 further comprising means for displacing said plate in translation past said dispensing means so that said alveole is presented thereto, said dispensing means comprising a peristalic pump, at least one outlet pipe associated with said pump, a pivotable nozzle located at the free end of said outlet pipe, and means for abruptly stopping the pivotable movement of said nozzle so that a drop of said reaction medium which has welled up in the free end of said nozzle is deposited in said alveole.

13. Apparatus according to claim 1 wherein the support comprises a plate and the micro-containers are grouped in rows and columns on said plate.

14. Apparatus according to claim 1 wherein the support comprises a thin glass plate and the micro-containers are bonded to said plate.

15. Apparatus according to claim 14 wherein the transfer means includes retractable ratchet wheels, cooperating with columns of micro-containers not filled with reaction media, for extracting a support from a housing at one station and introducing said support into the housing of an adjacent station.

16. Apparatus according to claim 14 wherein the transfer means include push-button devices for extracting a support from a housing at one station and introducing said support into the housing of an adjacent station and retractable lock means for maintaining the support in the housing of one station during the rotation of said housing.

17. Apparatus according to claim 14 wherein the support pusher means is displaced at right angles to the plane by an amount approximately equal to half the thickness of a support in order to maintain the support in the housing of a station during the rotation of said housing.

18. Apparatus according to claim 1 wherein said sample and reagent dispensing station includes pump means for dispensing a said reaction medium, said pump means including an outlet tube having a pivotable nozzle at the free end thereof, and means for abruptly stopping the pivoting movement of said nozzle so as to cause the deposit of a micro-drop of said reaction medium into a said micro-container.

19. Apparatus according to claim 18, further comprising means at said sample and reagent dispensing station for washing and flushing the pipes of said peristaltic pumps.

20. Analysis apparatus according to claim 1, wherein the sample and reagent dispensing station comprises a plurality of peristaltic pumps for dispensing said samples, said pumps being mounted on a movable base adapted to be reciprocally displaced in a plane parallel to the plane of said supports when located at said sample and reagent dispensing station.

21. Apparatus according to claim 1 further including a programmer means for controlling, in accordance with a predetermined cycle, sample and reagent dispensing operations at said sample and reagent dispensing station, transferring by said transfer means of said supports from one station to another with rotation about their said axes of rotation, the programmer being operative to selectively interrupt the rotation of the supports about their said axes at at least one station.

* * * * *

UNITED STATES PATENT OFFICE
CERTIFICATE OF CORRECTION

PATENT NO. : 3,909,201
DATED : September 30, 1975
INVENTOR(S) : CLAUDE MATTE

It is certified that error appears in the above-identified patent and that said Letters Patent are hereby corrected as shown below:

Renumber Claim 10 as Claim 8

Renumber Claim 8 as Claim 9 and in line 1 thereof, change "6" to read --8-- line 2, change "device" to read --means--

Renumber Claim 9 as Claim 10 and in line 1 thereof, change "6" to read --8-- line 4, change "device " to read --means--

Renumber Claim 11 as Claim 12 and in line 1 thereof, change "10" to read --11--

Renumber Claim 12 as Claim 11 and in line 1 thereof, change "10" to read --8--

Claim 19, lines 3 and 4, change "peristaltic pumps" to read --pump means--

Signed and Sealed this

Twenty-eighth Day of September 1976

[SEAL]

Attest:

RUTH C. MASON
*Attesting Officer*

C. MARSHALL DANN
*Commissioner of Patents and Trademarks*